United States Patent
Minto

(10) Patent No.: US 12,403,975 B2
(45) Date of Patent: Sep. 2, 2025

(54) BICYCLE EQUIPMENT PROVIDED WITH AN ELECTRIC POWER SUPPLY UNIT

(71) Applicant: CAMPAGNOLO S.R.L., Vicenza (IT)

(72) Inventor: Marco Minto, Mirano (IT)

(73) Assignee: CAMPAGNOLO S.R.L., Vicenza (IT)

( * ) Notice: Subject to any disclaimer, the term of this patent is extended or adjusted under 35 U.S.C. 154(b) by 540 days.

(21) Appl. No.: 17/953,984

(22) Filed: Sep. 27, 2022

(65) Prior Publication Data

US 2023/0101681 A1   Mar. 30, 2023

(30) Foreign Application Priority Data

Sep. 28, 2021 (IT) .......................... 102021000024716

(51) Int. Cl.
| | |
|---|---|
| *B62J 43/30* | (2020.01) |
| *B62J 43/20* | (2020.01) |
| *B62M 25/08* | (2006.01) |
| *H02J 7/00* | (2006.01) |

(52) U.S. Cl.
CPC .............. *B62J 43/30* (2020.02); *B62J 43/20* (2020.02); *B62M 25/08* (2013.01); *H02J 7/0045* (2013.01)

(58) Field of Classification Search
CPC ......... B62J 43/30; B62J 43/20; B62M 25/08; H02J 7/0045
See application file for complete search history.

(56) References Cited

U.S. PATENT DOCUMENTS

| | | | | |
|---|---|---|---|---|
| 9,399,499 B2* | 7/2016 | Honda | ...................... | B62M 6/90 |
| 9,469,378 B2* | 10/2016 | Kuwayama | .......... | B62M 9/1342 |
| 9,890,838 B2* | 2/2018 | Shipman | .................. | B62J 43/20 |
| 10,981,625 B2* | 4/2021 | Brown | ...................... | B62M 1/36 |
| 11,731,732 B2* | 8/2023 | Shipman | ................ | B62M 9/131 |
| | | | | 474/160 |

(Continued)

FOREIGN PATENT DOCUMENTS

| | | |
|---|---|---|
| DE | 102019106626 A1 | 9/2020 |
| EP | 2112060 A2 | 10/2009 |

(Continued)

OTHER PUBLICATIONS

Italian Search Report for Italian Application No. 102021000024716 dated Jun. 10, 2022.

*Primary Examiner* — Jacob B Meyer
(74) *Attorney, Agent, or Firm* — Ipsilon USA—NLO

(57) ABSTRACT

An electrically powered bicycle equipment has a component with a seat for removable attachment of an electric power supply unit, and a clamping device of the electric power supply unit to the component. The clamping device is pivotally supported by the component or the electric power supply unit about a first geometric axis stationary with respect thereto, and about a second geometric axis, which is parallel to, pivotal about, and not translatable with respect to, the first geometric axis. Either the component or the electric power supply unit has a retainer member and the clamping device has a retainable member that is urged against the retainer member. The rotation of the clamping device in a first direction about the first axis and in a second direction opposed to the first direction about the second axis allows the retainable member to be brought beyond the retainer member during clamping and unclamping.

18 Claims, 8 Drawing Sheets

(56) References Cited

U.S. PATENT DOCUMENTS

| | | | |
|---|---|---|---|
| 2007/0191159 A1* | 8/2007 | Fukuda | B62M 9/1242 |
| | | | 474/70 |
| 2008/0227572 A1* | 9/2008 | Sakaue | B62M 9/122 |
| | | | 474/82 |
| 2015/0022717 A1* | 1/2015 | Coons | B65D 45/24 |
| | | | 348/373 |
| 2015/0380709 A1* | 12/2015 | Mizrahi | H01M 50/209 |
| | | | 429/93 |
| 2017/0078537 A1* | 3/2017 | Peddecord | H04N 23/55 |
| 2018/0257736 A1* | 9/2018 | Komatsu | B62J 45/41 |
| 2019/0100279 A1* | 4/2019 | Brown | B62M 9/127 |
| 2019/0100280 A1* | 4/2019 | Brown | B62M 1/36 |
| 2023/0101681 A1* | 3/2023 | Minto | B62J 43/20 |
| | | | 280/288.4 |
| 2023/0112226 A1* | 4/2023 | De Poli | H01R 4/10 |
| | | | 439/271 |

FOREIGN PATENT DOCUMENTS

| | | |
|---|---|---|
| EP | 3873797 A1 | 9/2021 |
| TW | M591071 U | 2/2020 |
| WO | 2020092724 A1 | 5/2020 |

* cited by examiner

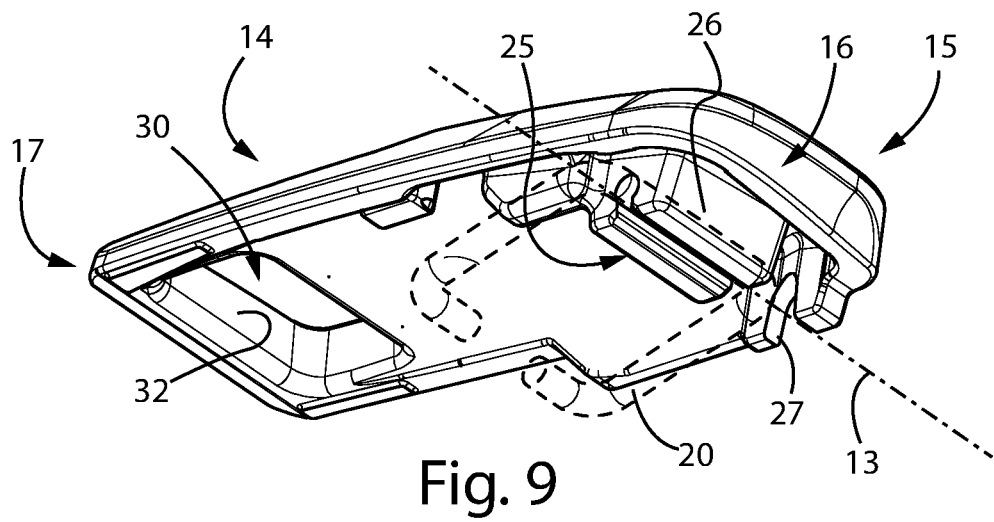
Fig. 9
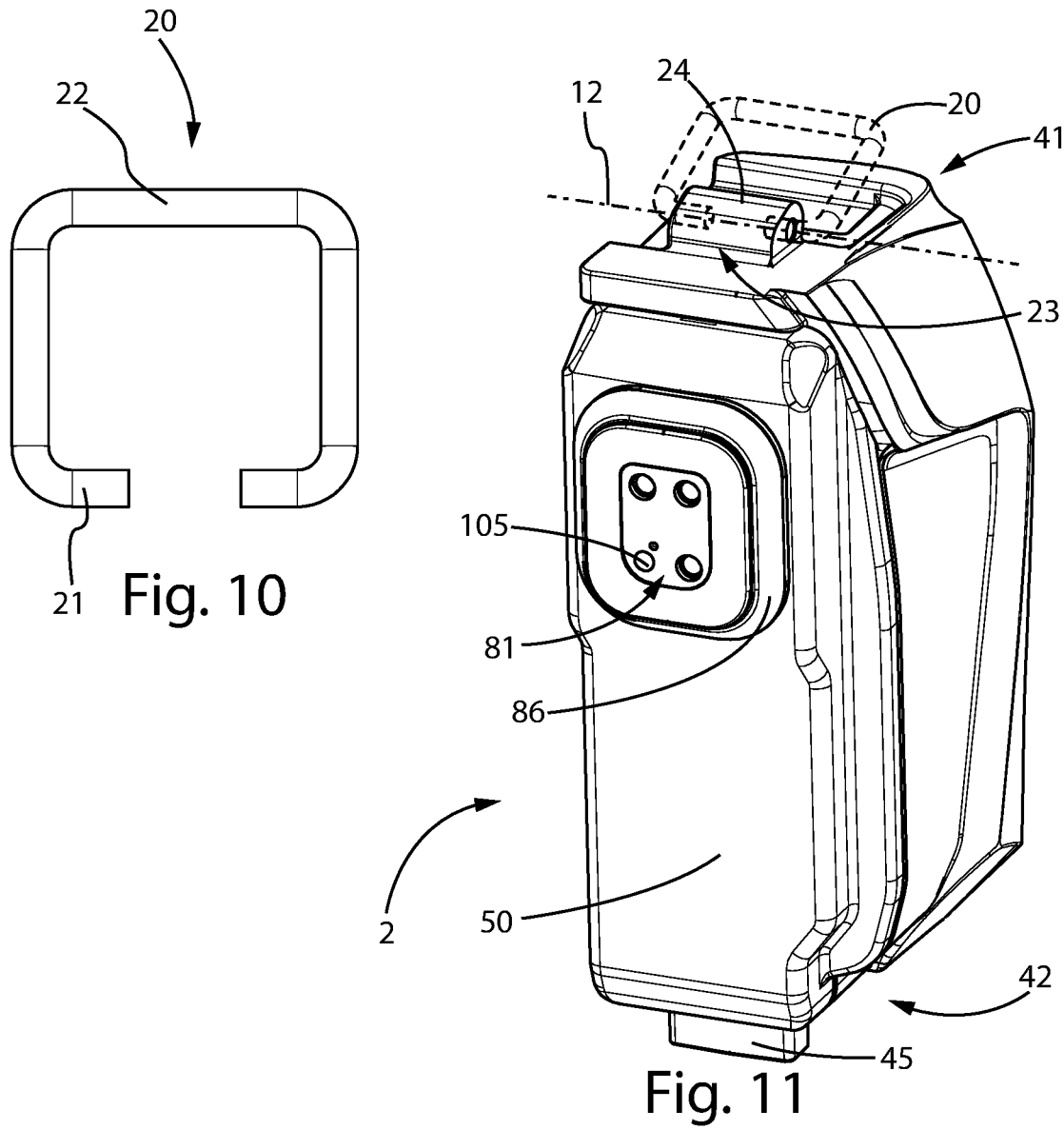
Fig. 10
Fig. 11

BICYCLE EQUIPMENT PROVIDED WITH AN ELECTRIC POWER SUPPLY UNIT

CROSS REFERENCE TO RELATED APPLICATIONS

This application claims the benefit of Italian Patent Application No. 102021000024716, filed on Sep. 28, 2021, which is incorporated herein by reference as if fully set forth.

FIELD OF INVENTION

The present invention relates in general to a bicycle equipment provided with an electric power supply unit.

BACKGROUND

Bicycle electric/electronic pieces of equipment which require an electric power supply unit, typically of the secondary cell battery type, comprise for example a derailleur associated with the bottom bracket spindle, a derailleur associated with the hub of the rear wheel, a suspension, a saddle setting adjuster, a lighting system, a satellite navigator, a training device, an anti-theft device, a cycle computer capable of providing information on the status of the bicycle, of the cyclist and/or of the route, a torque or power meter, a motor of a pedal assisted bicycle, a manual control device of another equipment, and others.

The technical problem at the basis of the invention is to provide a bicycle equipment with an electric power supply unit which may be attached and detached in an easy and quick manner, still being firmly held during use of the bicycle, despite the shocks and vibrations to which it is subject and the conditions of exposure to dirt and humidity to which the equipment is subject; desirably the weight and cost associated with the members intended for removable attachment of the electric power supply unit should be contained.

SUMMARY

The disclosed electrically powered bicycle equipment comprises an electric power supply unit comprising one or more secondary cells. A component is also provided that has a seat for removable attachment of the electric power supply unit. The seat and the electric power supply unit have matching electric contacts that establish electric connection in the seated state of the electric power supply unit. At least one clamping device of the electric power supply unit to the component in the seated state of the electric power supply unit is provided. The at least one clamping device is pivotally supported by one of the component and the electric power supply unit about a first geometric axis stationary with respect to said one of the component and the electric power supply unit, and about a second geometric axis. The geometric second axis is parallel to, pivotal about, and not translatable with respect to, the first geometric axis. The other one of the component and the electric power supply unit has a retainer member and the clamping device has a retainable member. In the clamped status of the clamping device: the retainable member is urged against the retainer member in an oriented removal direction of the electric power supply unit from the component, orthogonal to the first geometric axis. The first axis is interposed between the second axis and the retainable and retainer members in the oriented removal direction. The second axis is closer to said one of the component and the electric power supply unit with respect to the first axis in a third direction orthogonal to the direction of the rotation axes and to the oriented removal direction. The rotation of the clamping device in a first direction about the first axis and in a second direction opposed to the first direction about the second axis allows the retainable member to be brought beyond the retainer member during clamping and unclamping.

BRIEF DESCRIPTION OF THE DRAWINGS

Further features and advantages of the present invention will become clearer from the following detailed description of some preferred embodiments thereof, made with reference to the attached drawings, wherein:

FIGS. 9-11 show some members of the electric power supply unit and of a clamping device thereof to the bicycle equipment.

DETAILED DESCRIPTION OF EMBODIMENTS

Figure 1:
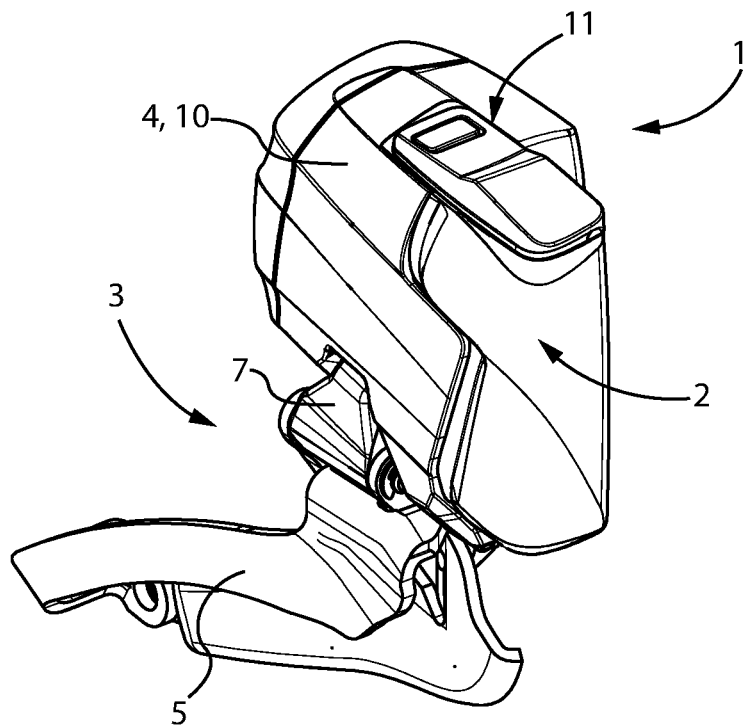
FIG. 1 is a perspective view of a bicycle equipment provided with an electric power supply unit.

In the present disclosure, under "equipment" a set of components mechanically coupled with each other and configured to be attached to the bicycle in a single location is meant to be understood. Thus, the equipment may comprise for example a derailleur or a manual control device for a derailleur attachable to the handlebars or in proximity thereto, but not the assembly of both.

In the present disclosure, expression "electric/electronic" is used to indicate an electric device that may also include electronic components and/or a data processing system.

The electric power supply unit is typically removably attached to the bicycle equipment, in order to allow the recharge from the mains (possibly through a recharge base) besides any of recharging it on board of the bicycle, and/or in order to allow it to be replaced in case of performance degradation.

In the present disclosure, a mechanical connection between two members is said to be "removable" if it allows them to be detached without the aid of tools.

In an aspect, the invention relates to an electrically powered bicycle equipment, comprising:

an electric power supply unit comprising one or more secondary cells, a component having a seat for removable attachment of the electric power supply unit, the seat and the electric power supply unit having matching electric contacts that establish electric connection in the seated state of the electric power supply unit, and at least one clamping device of the electric power supply unit to the component in the seated state of the electric power supply unit, wherein said at least one clamping device is pivotally supported by one of the component and the electric power supply unit about a first geometric axis stationary with respect to said one of the component and the electric power supply unit, and about a second geometric axis, the second geometric axis being parallel to, pivotal about, and not translatable with respect to, the first geometric axis, wherein the other one of the component and the electric power supply unit has a retainer member and the clamping device has a retainable member, wherein in the clamped status of the clamping device:

the retainable member is urged against the retainer member in an oriented direction of removal of the electric power supply unit from the component, orthogonal to the first geometric axis, the first axis is interposed between the second axis and the retainable and retainer members in the oriented removal direction, the second axis is closer to said one of the component and the electric power supply unit with respect to the first axis in a third direction orthogonal to the direction of the rotation axes and to the oriented removal direction, and wherein the rotation of the clamping device in a first direction about the first axis and in a second direction opposed to the first direction about the second axis allows the retainable member to be brought beyond the retainer member during clamping and unclamping.

In the present disclosure, under "oriented direction" it is meant to refer to a way along a direction, excluding the opposite way.

In the present disclosure, under opposed rotation directions it is meant that either one is a clockwise rotation and the other one is a counterclockwise rotation and vice versa.

Thanks to the possibility of rotating about two parallel axes, it is possible to perform an easy movement that brings the retainable member into engagement or out of engagement with the associated retainer member, clamping and unclamping the clamping device. The configuration is however simple and light, avoiding return springs or other components and mechanisms which operativeness could easily be compromised by the dirt and humidity conditions of a bicycle.

The retainable member and the retainer member may embody an effective coupling in retaining, in the clamped status of the clamping device, the electric power supply unit also in the third direction.

The retainable member and the retainer member may have mutually abutting surfaces in the clamped status of the clamping device. The surface of the retainable member exerts a pushing force on the surface of the retaining member, which acts as an abutment or limiter.

Said surfaces may be slanted with respect to the removal direction, a first edge being comparatively close to the first axis in the removal direction and to said one of the component and the electric power supply unit in the third direction, and a second edge opposed to the first edge being comparatively far from the first axis in the removal direction and from said one of the component and the electric power supply unit in the third direction. In this manner, the retainable member and the retainer member embody a "hook-like" coupling.

The retainable member and the retainer member may embody an effective coupling also in retaining the electric power supply unit in the direction of the rotation axes in the clamped status of the clamping device—alternatively or additionally to the efficiency in retaining the electric power supply unit in the third direction.

To this end, the retainable member and the retainer member may comprise a protrusion and a cavity oversized with respect to the protrusion in the removal direction but not in the direction of the rotation axes.

In the present disclosure, term "cavity" is broadly meant to encompass a through cavity and a blind bottom cavity or recess.

The first axis and the second axis may be defined by two opposed ends of a rigid member, having sufficient stiffness to withstand the traction in the clamped status of the clamping device, the two opposed ends extending in respective pivoting seats formed on facing faces, in the clamped status of the clamping device, of said one of the component and the electric power supply unit and of the clamping device.

The rigid member may be a possibly split quadrangular ring.

At least one of the pivoting seats may comprise a cylindrical undercut cavity.

In the present disclosure, under "undercut" a recessed surface that is inaccessible using a straight tool is meant to be indicated.

The rigid member may be a quadrangular ring split at one of the two opposed sides, the corresponding pivoting seat comprising a through hole or a pair of coaxial blind holes.

The quadrangular ring has in that case sufficiently low stiffness to allow the two portions of its split side to be spread for their insertion in the two blind holes or in the two ends of the through hole during assembly.

The seat for removable attachment of the electric power supply unit may be configured to retain at least one region of the electric power supply unit, substantially opposed to a region involved by the clamping device, against removal from the component in at least one way in the direction of the rotation axes and/or in at least one way in the third direction.

Alternatively or additionally, a second clamping device may be provided for in said region of the electric power supply unit substantially opposed to the region involved by the clamping device.

The seat may be configured to allow and possibly oblige seating the electric power supply unit through a roto-translational movement.

The matching electric contacts may be provided on paired surfaces of the electric power supply unit and of the component, extending substantially orthogonal to the removal direction.

The electric contacts of one and a same between the electric power supply unit and the component may be of the pogo pin type.

In at least one of the electric power supply unit and the component, the ground electric contact may be more outcropping than the other electric contacts.

The matching electric contacts may be arranged in a protrusion and a cavity of complementary shapes. For example, the pogo pin contacts may be arranged in a cavity so as not to protrude when the electric power supply unit is not seated.

The protrusion may have a peripheral groove, a hermetically sealing gasket extending in said peripheral groove.

The bicycle equipment may be a bicycle derailleur comprising:

a plurality of mutually movable components, comprising a support body configured to be attached to a bicycle frame, a chain guide, and a pair of connecting arms extended between the support body and the chain guide, and a geared motor controlling the mutual motion between chain guide and support body, wherein said component having a seat for the electric power supply unit is a preselected component of the mutually movable components.

In the present disclosure, term "chain guide" is used to indicate the component which, overall, is moved with respect to the support body and to the connecting arms; in the case of a rear derailleur it may include a first member articulated in the articulated parallelogram, sometimes called "bottom body" and a second member movable therewith, sometimes called "rocker arm", while in the case of a front derailleur it typically comprises a single member, sometimes called "cage".

In the present disclosure, under term "geared motor", a motor not coupled with any speed reducer is meant to be encompassed.

The derailleur is, for example, a front derailleur.

In that case, the preselected component is for example the support body.

Alternatively, the derailleur may be a rear derailleur, the preselected component being for example a connecting arm.

The geared motor may be housed in the preselected component.

Alternatively, the geared motor may be housed in a second component of the plurality of mutually movable components different from the preselected component, an electrical connection being provided for, extended between the contacts of the seat and the second component.

The derailleur may also include a data processing system, controlling the geared motor and any other electric/electronic components of the derailleur. The data processing system may comprise electric components and/or discrete electronic components and/or a micro-controller, which may also integrate memory means. The data processing system may be borne for example on at least one printed circuit board or PCB. The derailleur may therefore be electronic.

With reference the drawings, in FIGS. 1-4 an illustrative bicycle equipment 1 is shown, provided with an electric power supply unit 2.

In the case shown, the bicycle equipment 1 is a front derailleur 3 comprising a support body 4 configured to be attached to a bicycle frame, a chain guide 5 and a pair of connecting arms 6, 7 extended between the support body 4 and the chain guide 5, forming a plurality of mutually movable components and in particular an articulated parallelogram. The pair of connecting arms comprises a proximal connecting arm 6 and a distal connecting arm 7. In the present disclosure, adjectives such as "proximal" and "distal" refer to the mounted condition of the derailleur on the bicycle. In particular, "proximal" is used to mean closer to the frame, and adjective "distal" is used to mean farther from the frame.

The derailleur 3 comprises a geared motor (not visible). The geared motor may be purely electric or electronic, when the derailleur 3 also includes a data processing system for controlling the geared motor and any other electric/electronic components of the derailleur 3, for example comprising one or more components borne by one or more printed circuit boards or PCB. As mentioned above, the geared motor may also comprise a motor not coupled with any speed reducer.

The geared motor controls the mutual motion between chain guide 5 and support body 4, in particular determines the aperture and closure of the articulated parallelogram, and therefore the displacement of the chain guide 5 in the direction of the bottom bracket spindle, so as to bring the transmission chain or belt into engagement with a predetermined toothed wheel or chainring of the crankset. The geared motor is for example housed in the support body 4 and controls the rotation of one of the connecting arms 6, 7 (in the case shown, the proximal connecting arm 6) about a pivot axis thereof to the support body 4. For example, the support body 4 may be attached to the frame through a screw in screw engagement with the threaded hole 8.

The electric power supply unit 2 comprises one or more secondary cells and may have a hermetic case housing said one or more secondary cells. The electric power supply unit 2 may also include at least one printed circuit board or PCB (cf. the PCB 49 in FIG. 12) bearing electronic components controlling the electric power supply unit 2, housed in the hermetic case. The electric power supply unit 2 may therefore be a so-called smart battery.

Figure 3:
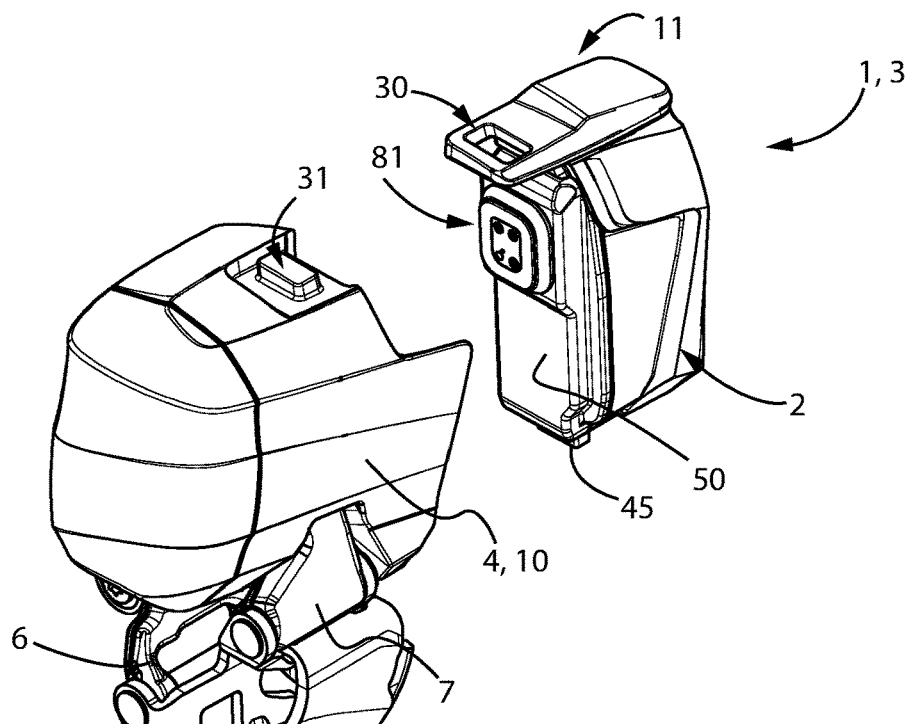
FIG. 3 is a perspective view of the bicycle equipment of FIG. 1 with the electric power supply unit detached.
Figure 4:
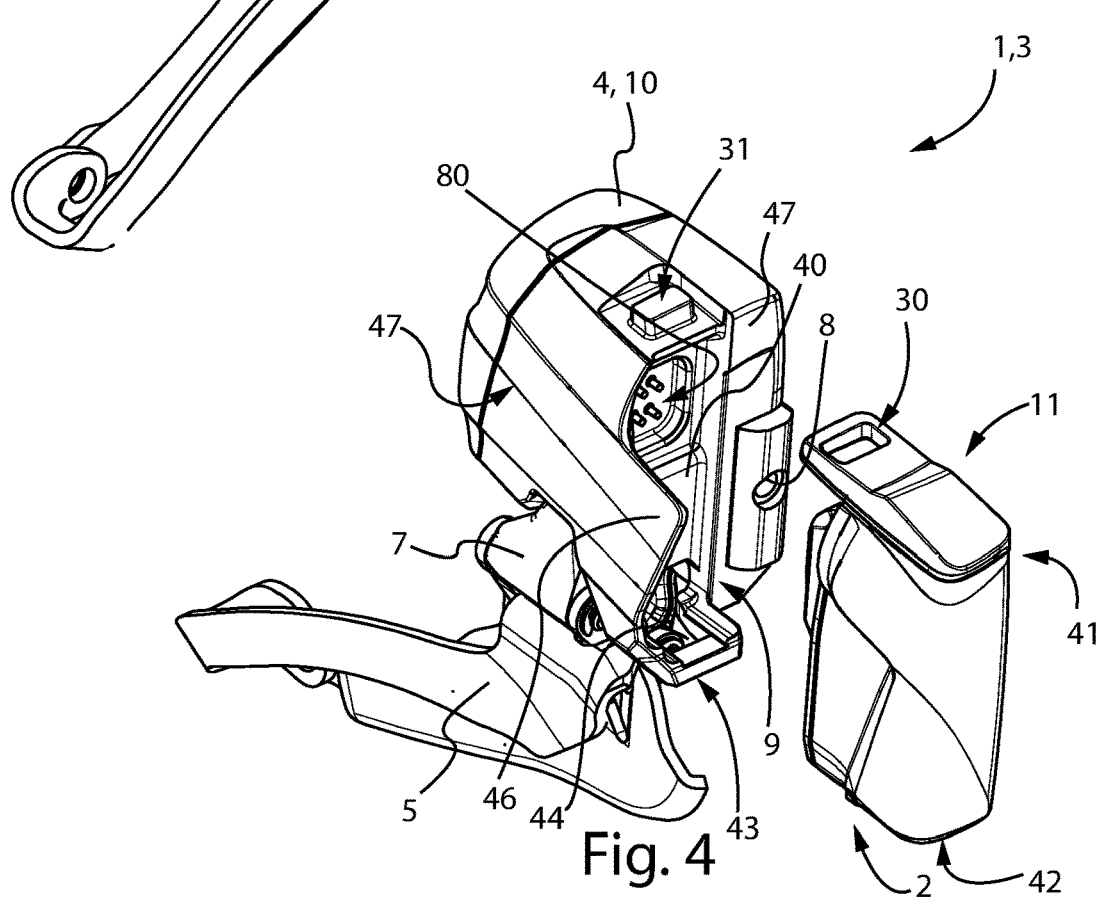
FIG. 4 is a view according to another perspective of the bicycle equipment of FIG. 1 with the electric power supply unit detached.
Figure 5:
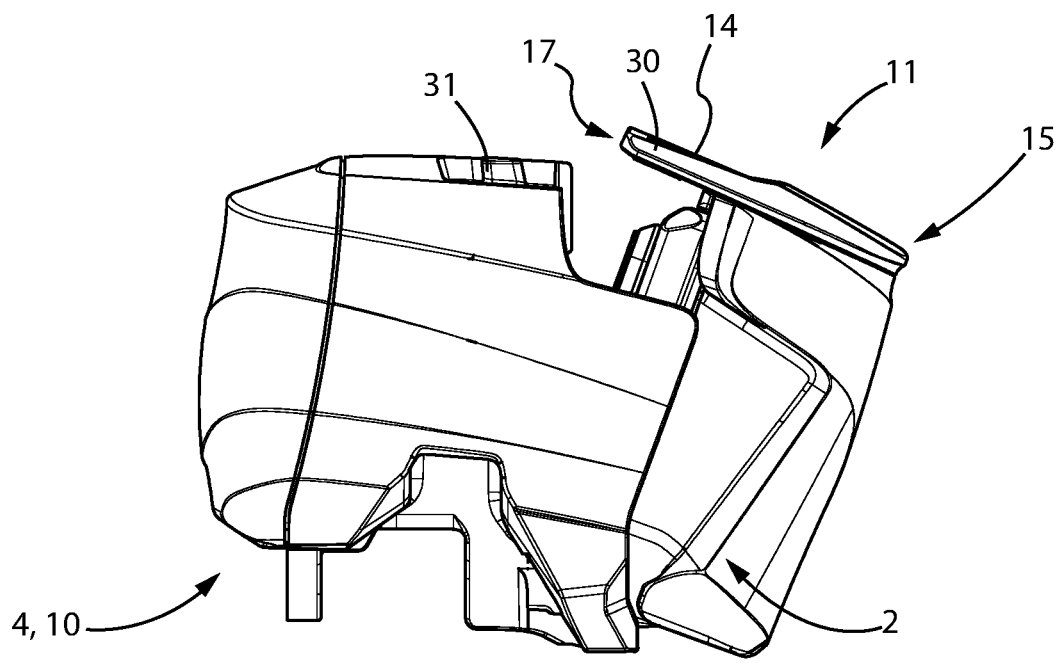
FIGS. 5-8 show some steps during the seating and blocking movement of the electric power supply unit onto a component of the bicycle equipment of FIG. 1, in a front view.

The electric power supply unit 2 is removably attached to the derailleur 3 and is shown in the detached condition in FIGS. 3-4. To that end, a component of the derailleur 1, the support body 4 in the case shown, has a seat 9 for the electric power supply unit 2. The component having the seat for the electric power supply unit is not necessarily the support body 4 and therefore hereinbelow the component provided with the seat 9 will be referred to as component 10.

At least one clamping device 11 of the electric power supply unit 2 to the component 10 in the seated state of the electric power supply unit 2 is provided for, wherein the electric power supply unit 2 is arranged in the seat 9. When the electric power supply unit 2 is seated and the clamping device 11 is locked, the electric power supply unit 2 is firmly held on the derailleur 3 despite the vibrations and the shocks to which it is subject during the travel of the bicycle.

In the case shown, the clamping device 11 is supported by the electric power supply unit 2.

With reference also to FIGS. 5-8, the clamping device 11 is pivotally supported about a first geometric axis 12 stationary with respect to the electric power supply unit 2 supporting it, as well as about a second geometric axis 13.

The second geometric axis 13 is parallel to the first geometric axis 12, is pivotal about the first geometric axis 12, and is not translatable with respect to the first geometric axis 12.

In the illustrative case shown, the clamping device 11 comprises a substantially flat and elongate or band-shaped main body 14, and the geometric axes 12, 13 extend along the transverse direction of the main body 14. In the case shown, the second geometric axis 13 extends in proximity to a first longitudinal end 15 of the main body 14. At the first longitudinal end 15 of the main body 14, a seat 16 (FIG. 9) may be made to favour the lifting of such first longitudinal end 15 with one or more fingers during unlocking of the clamping device 11.

The first geometric axis 12 is in a position corresponding to an intermediate position of the main body 14 in the clamped status of the clamping device 11.

The two geometric axes 12, 13 of rotation of the clamping device 11 may for example be defined by two opposed sides 21, 22 of a quadrangular ring 20, as shown in FIGS. 9-11 wherein the quadrangular ring 20 is shown alone (FIG. 10)

and, in dotted line, in the clamping device 11, coupled with its main body 14 (FIG. 9), and in the condition coupled with the electric power supply unit 2 (FIG. 11).

In the case shown, the first side 21 of the quadrangular ring 20 is split and extends in a pivoting seat 23 formed by a through hole or by two coaxial blind holes, made for example in a protrusion 24 of the electric power supply unit 2.

The second side 22 of the quadrangular ring 20 extends in a pivoting seat 25 which comprises a cylindrical undercut cavity, made for example in a protrusion 26 of the clamping device 11. If necessary, a slit 27 may be provided for on the clamping device 11 close to an end of the pivoting seat 25 for slidingly inserting the second side 22 of the quadrangular ring 20 thereinto.

The quadrangular split ring 20 has sufficient stiffness to withstand the traction in the clamped status of the clamping device 11, as better discussed hereinbelow. It is therefore a rigid member.

The quadrangular split ring 20 has, on the other hand, sufficiently low stiffness to allow spreading of the two portions of its first split side 21 for insertion thereof in the two blind holes or in the two ends of the through hole embodying the pivoting seat 23 during assembly.

The pivoting seats 23, 25 are formed on facing faces, in the clamped status of the clamping device 11, of the electric power supply unit 2 and of the clamping device 11.

The arrangement of the sides 21, 22 and of the respective pivoting seats 23, 25 might be inverted with respect to what is shown. Furthermore, the quadrangular ring 20 might not be split, for example providing for two pivoting seats each comprising a cylindrical undercut cavity.

The quadrangular ring 20 might be replaced by another member having the above mentioned characteristics of stiffness, for example a rigid plate or bar articulated at its ends in any suitable manner.

The clamping device 11, that as mentioned in the case shown is supported by the electric power supply unit 2, is configured to interact with the component 10 so as to firmly retain the electric power supply unit 2 thereon in the clamped status of the clamping device 11 itself.

In particular, the clamping device 11 has a retainable member 30 associated with a retainer member 31 provided on the component 10. In the case shown, the retainer member 31 is in the form of a protrusion and the retainable member 30 is in the form of a cavity sized to accommodate the retainer member 31. The cavity is shown as a through one, but alternatively it could be blind.

The retainable member 30 is provided for in proximity to a second longitudinal end 17 of the main body 14, opposed to the first longitudinal end 15.

Figure 6:
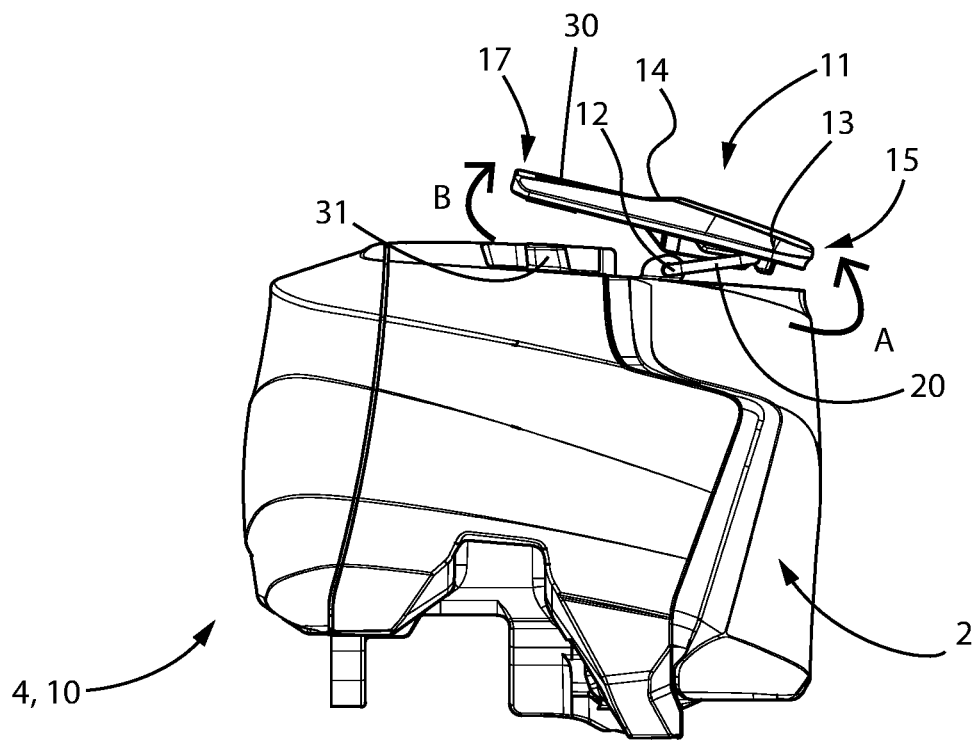
Figure 7:
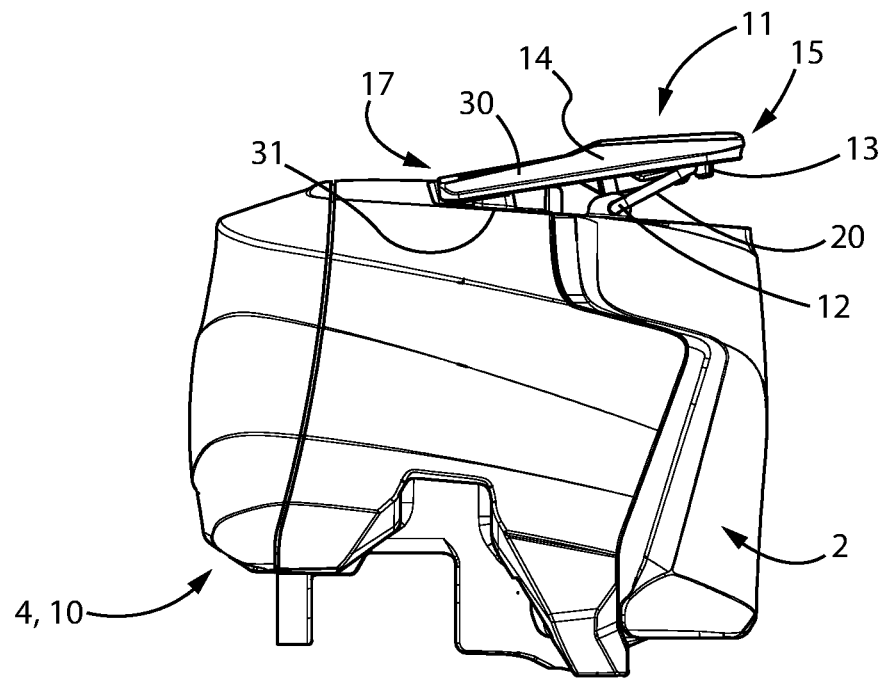

Turning back to FIGS. 5-8, it is seen that the rotation of the clamping device 11 in a first direction A about the first axis 12 (counterclockwise rotation in the drawings) and in the second direction B (clockwise rotation in the drawings) opposed to the first direction A about the second axis 13 allows the retainable member 30 of the clamping device 11 to be brought beyond the retainer member 31, herein provided on the component 10, during clamping and unclamping. The retainable member 30 "climbs over" the retainer member 31. Arrows A, B are shown in FIG. 6, representing the movement which intervened between the position of FIG. 5 and that of FIG. 6.

When such "climbing over" has occurred (FIG. 7), the rotation in the opposed directions, namely in the second direction B about the first axis 12 and in the first direction A about the second axis 13, accompanied by the application of the necessary force, allows the clamping device 11 to be brought in the clamped status. Arrows B, A are shown in FIG. 8, representing the movement that occurred between the position of FIG. 7 and that of FIG. 8.

Figure 2:
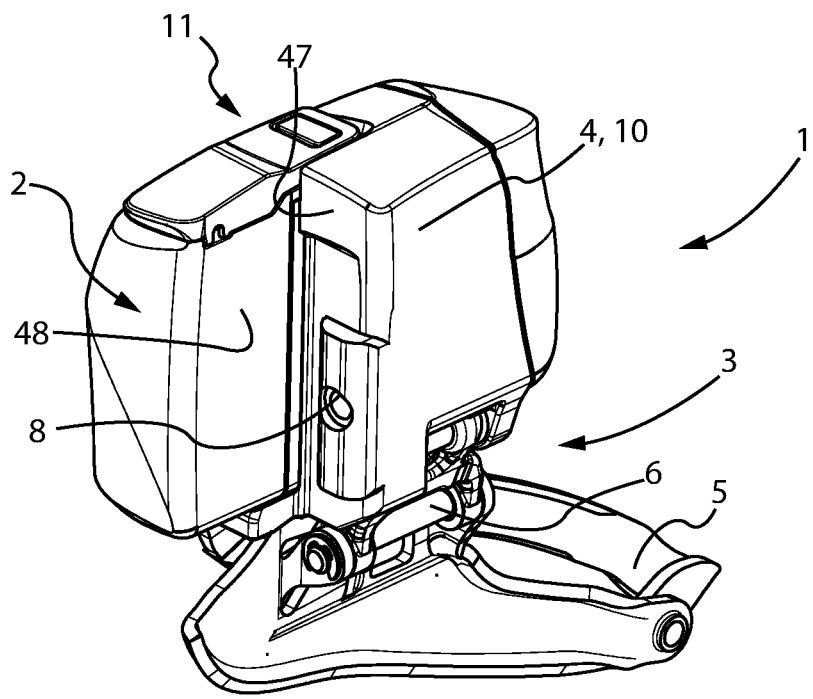
FIG. 2 is a view according to another perspective of the bicycle equipment provided with an electric power supply unit of FIG. 1.
Figure 8:
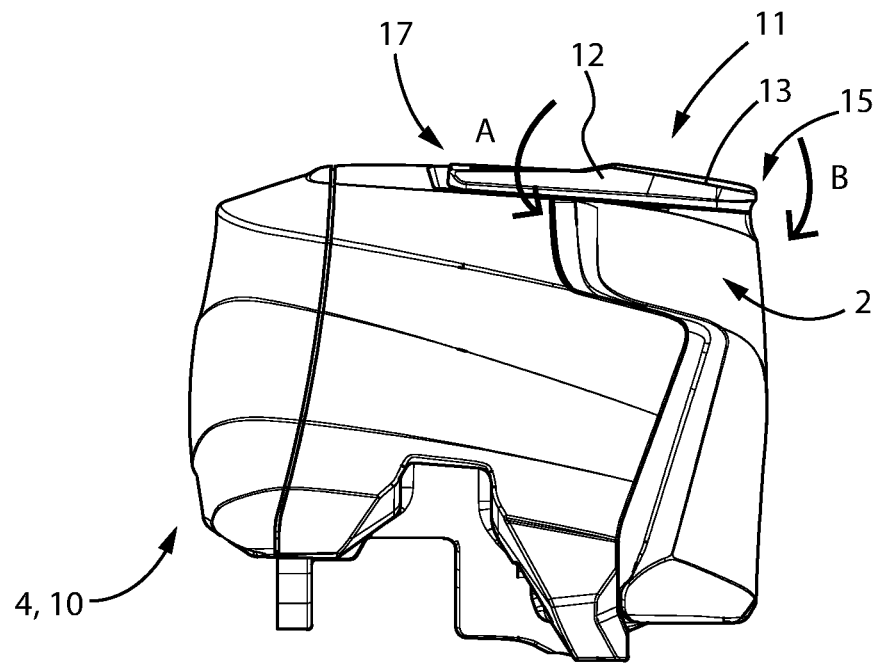
Figure 12:
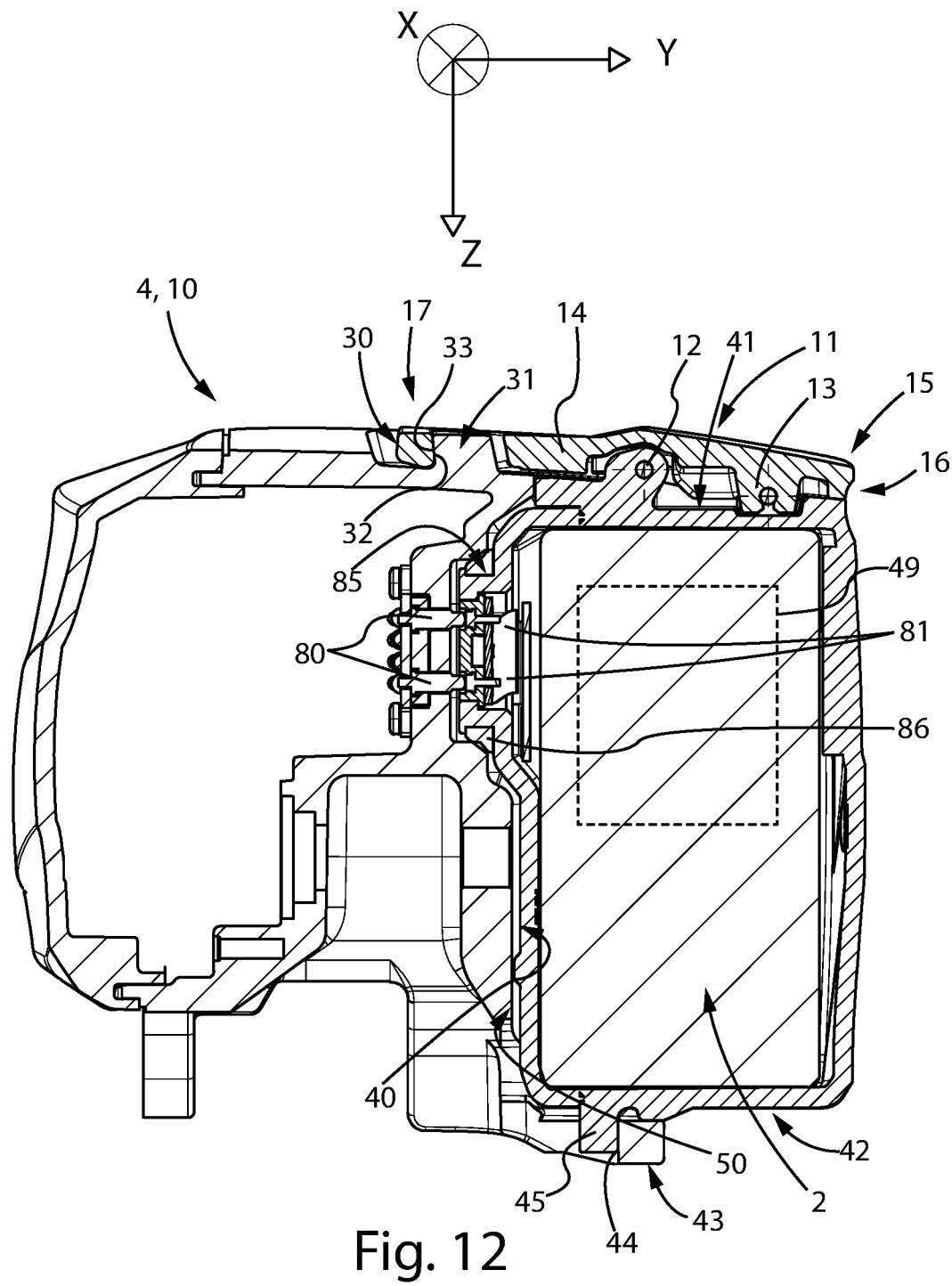
FIG. 12 is a cross-sectional view across the bicycle equipment provided with electric power supply unit, with the clamping device in clamped status.
Figure 13:
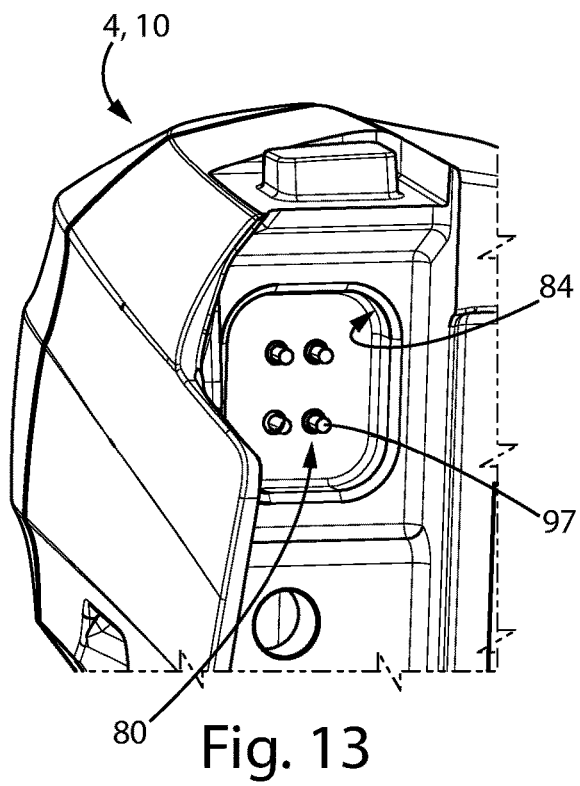
FIGS. 13-16 show some details relating to the electric connection of the electric power supply unit to the bicycle equipment.

With reference also to FIG. 12 besides to FIGS. 1, 2, 8, in the clamped status of the clamping device, the retainable member 30 is urged against the retainer member 31 in the positive direction of axis Y shown in FIG. 12, which represents in general an oriented removal direction of the electric power supply unit 2 from the component 10, which is orthogonal to the direction defined by the rotation axes 12, 13 or axis X shown in FIG. 12 (entering the drawing plane). In this manner, the retainable member 30 and the retainer member 31 embody a coupling effective in retaining the electric power supply unit 2 in the oriented removal direction or axis Y.

In particular, the retainable member 30 and the retainer member 31 have respective surfaces 32, 33 mutually abutting in the clamped status of the clamping device 11. The surface 32 of the retainable member 30 exerts a pushing force on the surface 33 of the retainer member 31, which acts as an abutment or limiter.

A second condition occurring in the clamped status of the clamping device 11 is that, looking in the oriented removal direction or axis Y, the first geometric axis 12 is interposed between the second geometric axis 13 (at the right thereof in the drawing) and the retainable and retainer members 30, 31 (at the left thereof in the drawing).

A third condition occurring in the clamped status of the clamping device 11 is that the second geometric axis 13 is closer to the electric power supply unit 2 with respect to the first geometric axis 12 in a third direction, or axis Z shown in FIG. 12, orthogonal to the direction of the rotation axes or axis X and to the oriented removal direction or axis Y. In FIG. 12, the second geometric axis 13 is thus lower than the first geometric axis 12.

As mentioned in the introductory part, the possibility of rotation of the clamping device 11 about the two parallel rotation axes 12, 13 thus allows the retainable member 30 to be brought into or out of engagement with the associated retainer member 31, locking and unlocking the clamping device 11 through a simple movement. Because return springs or other components and mechanisms are not necessary, the clamping device 11 is simple and of low weight, a factor that is of high relevance at least in the field of racing bicycles. Furthermore, the absence of complex mechanisms and of springs makes the clamping device 11 particularly strong and reliable, capable of remaining operative also in the conditions of dirt and humidity to which a bicycle is subject.

As mentioned above, in the case shown the retainer member 31 is in the form of a protrusion and the retainable member 30 is in the form of a cavity sized to accommodate the retainer member 31. More in particular, in the removal direction or axis Y, the cavity or retainable member 30 is oversized with respect to the protrusion or retainer member 31, so as to allow insertion thereof without relative sliding between said two surfaces 32, 33, and indeed in such a direction that there is a gap therebetween during the locking movement of the clamping device 11.

Said surfaces 32, 33 may be, as shown, slanted with respect to the removal direction or axis Y, so that the retainable member 30 and the retainer member 31 embody a "hook-like" coupling. In FIG. 12, the surfaces 32, 33 extend from top left to bottom right; in general the surfaces 32, 33 may have a first edge (bottom in FIG. 12) that is comparatively close to the first axis 12 in the removal direction (axis Y) and to the electric power supply unit 2 in the third direction (axis Z), and a second edge (top in FIG. 12) opposed to the first edge which is comparatively far from the first axis 12 in the removal direction (axis Y) and from the electric power supply unit 2 in the third direction (axis Z).

Alternatively or additionally to have slanted surfaces 32, 33 as just discussed, looking in the direction of the axes 12, 13 of rotation or axis X, the cavity defining (in the case shown) the retainable member 30 may not be oversized with respect to the protrusion defining (in the case shown) the retainer member 31, so that the retainable member 30 and the retainer member 31 embody a coupling effective also in retaining the electric power supply unit 2 in the direction of the rotation axes 12, 13 (axis X) in the clamped status of the clamping device 11.

Turning back to FIGS. 1-4, the seat 9 has a first surface 40 (FIG. 4) extending substantially orthogonal to the oriented removal direction (axis Y), which defines the stop position of the electric power supply unit 2, in the opposed oriented direction, of approach.

In the case shown, the region 41 of the electric power supply unit 2 involved by the clamping device 11 is intended to be higher in the condition wherein the derailleur 3 is mounted on the bicycle and with the bicycle in the condition of straight travel on level ground; in its opposed region 42, the electric power supply unit 2 is supported and held by the seat 9.

In the case shown, the seat 9 is in particular configured to retain said opposed region 42 of the electric power supply unit 2 against removal from the component 10 in the third direction (axis Z) downwards, in said condition of bicycle in straight travel on level ground and in FIG. 12. The seat 9 has, to that end, a lower bracket 43 onto which the electric power supply unit 2 rests.

In the case shown, the lower bracket 43 is provided with a cavity 44—shown as a through one, but which might also be blind—configured to accommodate a protrusion 45 (FIG. 3) provided on said opposed region 42 of the electric power supply unit 2. The cavity 44 is for example oversized with respect to the protrusion 45 in the removal direction (axis Y) but not in the direction of the rotation axes (axis X). In this manner, the seat 9 is configured to retain said opposed region 42 of the electric power supply unit 2 against removal from the component 10 in the direction of the rotation axes (axis X), still allowing the seating of the electric power supply unit 2 without particular friction, possibly with a roto-translational movement as manifest from a comparison of FIGS. 5 and 6.

The seat 9 shown has a wall 46 protruding in the oriented removal direction or axis Y, retaining the electric power supply unit 2 against removal in the direction of the rotation axes 12, 13 (axis X). The wall 46 is on the distal side of the derailleur 3, so as to protect the electric power supply unit 2 also against shocks.

The seat 9 may be shaped in a manner also appreciably different from what is shown, and support and retain the electric power supply unit 2 in a different manner and/or not in all the oriented directions mentioned above.

Alternatively or additionally, a clamping device analogous to the clamping device 11 may be provided for at said region 42 of the electric power supply unit 2 substantially opposed to the region 41 involved by the clamping device 11, and/or at other regions of the electric power supply unit 2, for example at the distal face and/or of the proximal face of the derailleur 3.

The electric power supply unit 2 shown is substantially in the shape of a rectangular parallelepiped, but the shape of the electric power supply unit 2 may differ even appreciably from that shown. For example the electric power supply unit 2 may be in the shape of an oblique parallelepiped, or it may comprise one or more concave or convex faces (or regions thereof).

Also the component 10 shown has a shape generically of rectangular parallelepiped shape, and the seat 9 for the electric power supply unit 2 involves, for example, only part of a face 47 thereof, as evident in FIGS. 2 and 4, roughly a half thereof. The remaining half of said face 47 of the component 10 and a face 48 of the electric power supply unit 2 adjacent thereto (proximal face of the electric power supply unit 2 in the case shown) turn out to be substantially orthogonal, so that the component 10 with the electric power supply unit 2 seated has a shape generally like a straight prism with L-shaped base.

In the case of the front derailleur 3 shown, the seat 9 is for example side by side with the attachment seat of the main body 4 to the seat post, bearing the threaded hole 8, so that the derailleur 3 with the electric power supply unit 2 seated may partly surround the seat post. The seat post then protects the electric power supply unit 2 against shocks, besides contributing to retain it against displacements in the direction of the rotation axes (axis X).

The seat 9 and the electric power supply unit 2 have matching electric contacts 80, 81 that establish electric connection in the seated state of the electric power supply unit 2. In the case shown, four pairs of matching electric contacts 80, 81 are provided for, among which two pairs are connected to the negative pole (ground) and to the positive pole (power supply) of the secondary cells of the electric power supply unit 2 and are provided to lead the power supply voltage from the electric power supply unit 2 to the user(s) provided for in the component 10, for example to the geared motor, and possibly for recharging the secondary cells when the electric power supply unit 2 is not seated. The other two pairs of matching electric contacts 80, 81 may be used for example for full duplex series connection between the equipment 1 and the electric power supply unit 2, when it is of the smart battery type, provided with electronic components borne for example by the PCB 49. From the electric power supply unit 2 to the equipment 1, for example the residual charge, the number of recharge cycles performed, etc., may be communicated. From the equipment 1 to the electric power supply unit 2, for example a serial number thereof, a firmware update program, a request to communicate said data, etc. may be communicated.

A different number of pairs of matching electric contacts 80, 81 and/or a different type and communication mode may however be provided for.

In the case shown, the matching electric contacts 80, 81 are provided on the first surface 40 of the seat 9 and on the surface 50 paired thereto of the electric power supply unit 2, extending substantially orthogonal to the removal direction Y. However, the matching electric contacts 80, 81 may be provided on other surfaces of the seat 9 and of the electric power supply unit 2, that enter into mechanical contact when the electric power supply unit 2 is seated, for example on the bracket 43 (for example by providing for the same to protrude more than shown) or on the protruding wall 46 and on the respectively paired surfaces of the electric power supply unit 2.

With reference also to FIGS. 13-16, regardless of where they are located, the matching electric contacts 80, 81 may be arranged in a protrusion 83 and a recess 84 of complementary shapes. In the case shown the protrusion 83 is made in the electric power supply unit 2 and the recess 84 is made in the component 20, but they might be inverted.

The protrusion 83 may have a peripheral groove 85 (FIG. 12), a hermetic seal 86 (FIG. 12, 15) extending in the peripheral groove 85.

By arranging the protruding or "male" contacts in the recess 84, they are more protected also when the electric power supply unit 2 is not seated.

The "male" electric contact, of the component 10 in the case shown by way of an example, may be of the pogo pin type.

Figure 14:
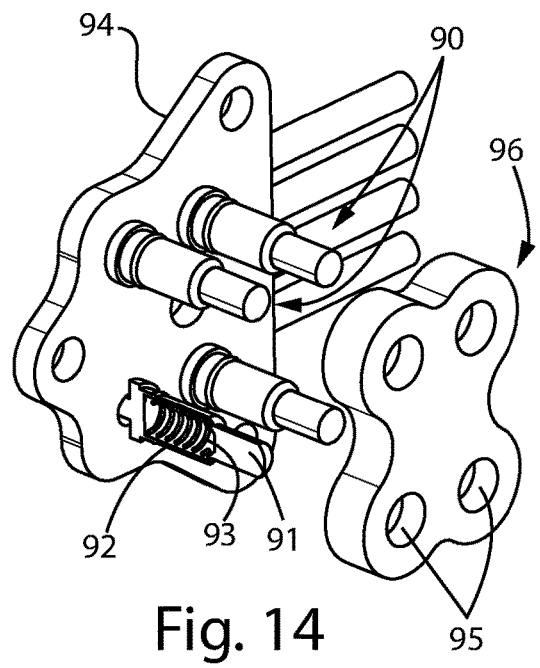
Figure 15:
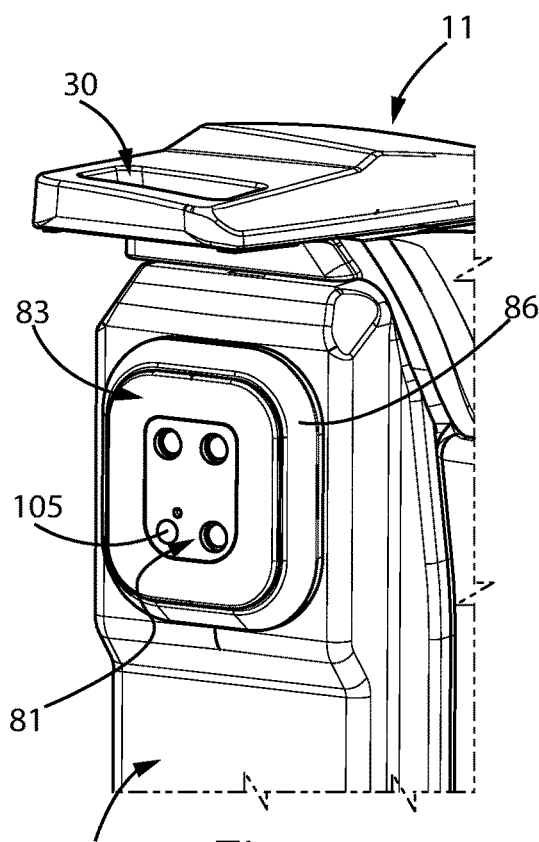
Figure 16:
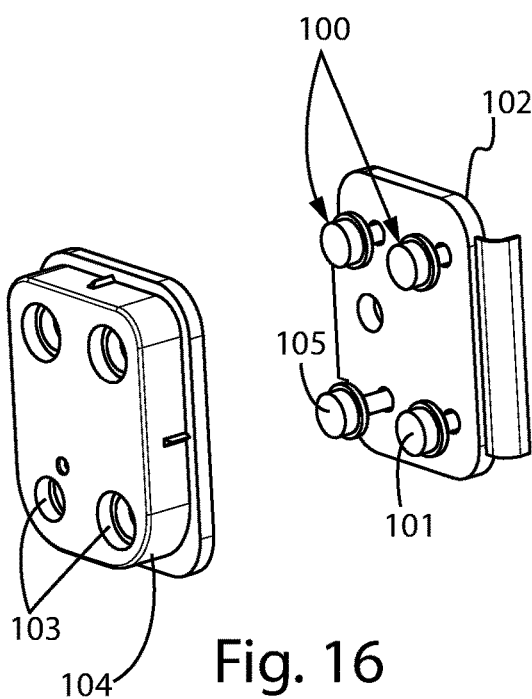

A pogo pin—see the pogo-pins 90 of which also a section is schematically shown in FIG. 14—comprises a plunger 91 sliding in a blind barrel 92; the plunger 91 is forced in the position protruding from the barrel 92, outwards, by a helical spring 93. The pogo pin contacts are for example gathered on a printed circuit board or PCB 94 and the barrels 92 extend through parallel through holes 95 of an electrically insulating support 96 that may also serve as a hermetic seal. Alternatively to the PCB 94, the pogo-pin may be directly tinned to the respective electrical conductors.

The matching contact 100 (FIG. 16) of a pogo pin comprises a plane or concave plate 101 contacting the plunger 91 of the pogo pin 90. The matching contacts 100 are for example gathered on a printed circuit board or PCB 102 and extend through parallel through holes 103 of an electrically insulating support 104 that may also serve as a hermetic seal. Alternatively, the plate 101 may be directly embodied by a plated pad on the PCB 102.

These types of matching contacts 90, 100 exhibit a high resilience of the electrical connection to shocks and vibrations, counteracting intermittent losses of electrical connection.

The ground electric contact 105 ("female" or matching contact 100 of the pogo pin 90) may be more outcropping than the other electric contacts of the electric power supply unit 2 (in the illustrative case shown). In the case shown, the electric contacts of the electric power supply unit 2 are arranged in two overlapping rows, and the more outcropping ground electric contact 105 is in the bottom row. In this manner, it is the first to enter into mechanical and electric contact with the respective pogo pin 97 during the roto-translational movement of seating of the electric power supply unit 2 described above, so as to protect the electronics by stabilizing the reference voltage level before the establishment of the remaining electrical connections.

Although the clamping device 11 is shown supported by the electric power supply unit 2 and interacting with the retainer member 31 provided on the component 10, those skilled in the art will understand, in the light of the previous description, that a dual configuration is possible, wherein the clamping device 11 is borne by the component 10 and the retainer member 31 is provided on the electric power supply unit 2.

Regardless of their location, alternatively to what has been shown, the retainable member 30 may be in the shape of a protrusion and the retainer member 31 may be in the shape of a cavity sized to accommodate the retainable member 30.

Still alternatively, the retainable member 30 and the retaining member 31 may comprise a plurality of protrusions and cavities, paired hooks, a hook and a loop, and in general they may adopt any configuration suitable to perform one or more of the functions described above.

Those skilled in the art will understand that the derailleur 3 may have a shape even considerably different from that shown and/or additional components, not shown for the sake of simplicity.

In the case shown, the geared motor and the seat 9 are both arranged in the support body 4. However the geared motor may be housed in a second component of the derailleur 3 or in general of the bicycle equipment 1, different from the component 10 preselected for the seat 9, an electric connection being provided for, extended between the contacts of the seat 9 and the second component.

The secondary cells of the electric power supply unit 2 may be recharged while the electric power supply unit 2 is on board of the bicycle, by providing for suitable recharging connectors, and/or the electric power supply unit 2 may be recharged in a recharge cradle after having been detached from the equipment 1, possibly exploiting the same electric contacts 81.

Although it has been described in the context of a front derailleur 3, the invention disclosed herein, included all variants and generalizations thereof, also applies to a rear derailleur.

Figure 17:
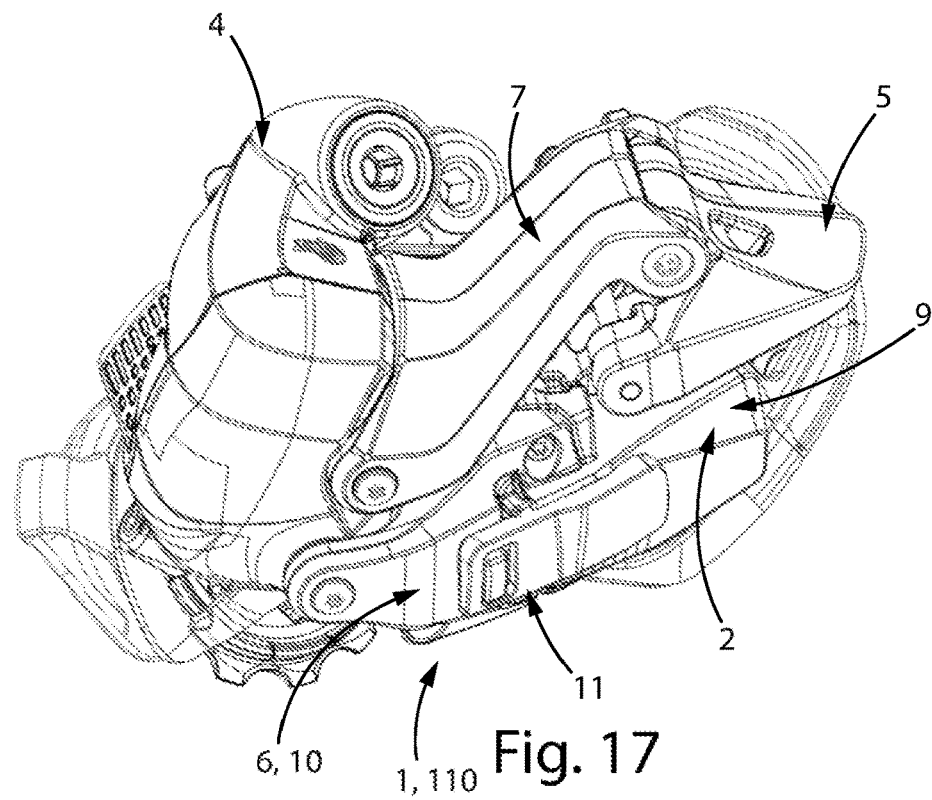
FIGS. 17 and 18 are perspective views of another bicycle equipment, with the electric power supply unit attached and partly detached, respectively.
Figure 18:
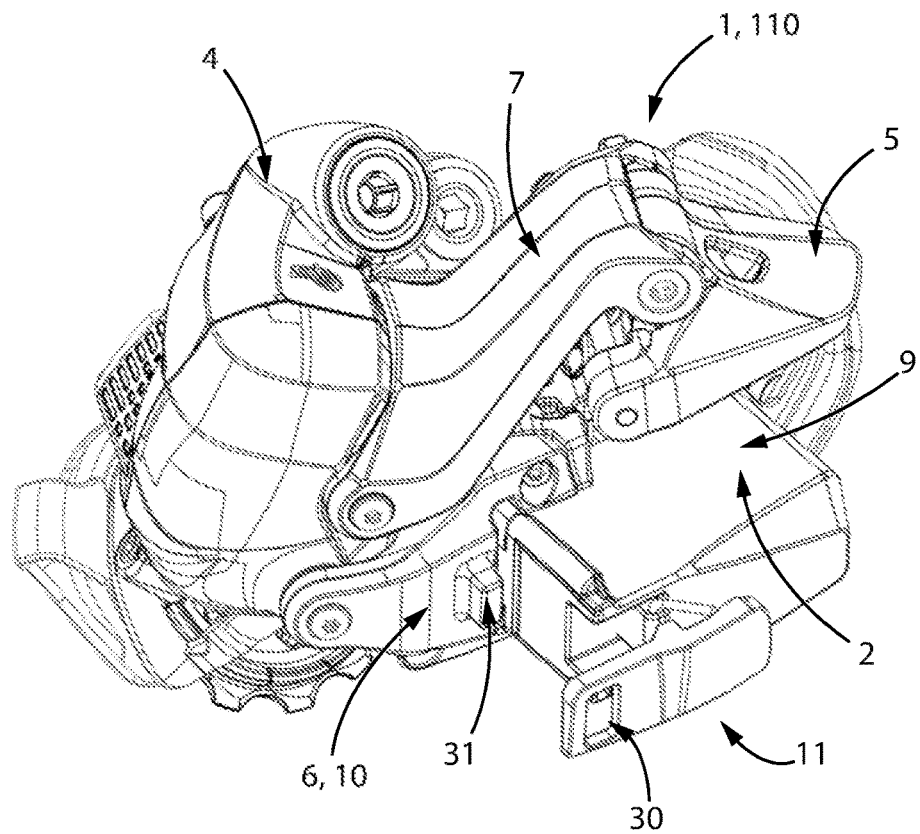

Merely by way of an example, FIGS. 17 and 18 show a rear derailleur 110, wherein the electric power supply unit 2 is attached and partly detached, respectively. Like numbers are used for members similar or corresponding to those used for the front derailleur 3.

In the case of the rear derailleur 110, the displacement of the chain guide 5 has at least one displacement component in the direction of the axis of the group of toothed wheels associated with the hub of the rear wheel or "sprocket assembly", so as to bring the transmission chain or belt into engagement with a predetermined toothed wheel or sprocket of the sprocket assembly.

In the case of the rear derailleur 110 shown, the component 10 having the seat for removable attachment of the electric power supply unit 2 is the proximal connecting arm 6 and the geared motor is, for example, supported by the top body 4, but also in this case different locations of the electric power supply unit 2 and of the geared motor are possible.

Furthermore, the invention disclosed herein also applies to different electrically powered bicycle equipment, for example one of those listed in the introductory part.

The various embodiments, variants and/or possibilities of each component or group of components that have been described are to be meant as combinable with each other in any manner, unless they are mutually incompatible.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. An electrically powered bicycle equipment, comprising:
   an electric power supply unit comprising one or more secondary cells,
   a component having a seat for removable attachment of the electric power supply unit,
   the seat and the electric power supply unit having matching electric contacts that establish electric connection in a seated state of the electric power supply unit, and
   at least one clamping device of the electric power supply unit to the component in the seated state of the electric power supply unit,
   wherein said at least one clamping device is pivotally supported by one of the component and the electric power supply unit about a first geometric axis stationary with respect to said one of the component and the electric power supply unit, and about a second geometric axis,
   the geometric second axis being parallel to, pivotal about, and not translatable with respect to, the first geometric axis,
   wherein the other one of the component and the electric power supply unit has a retainer member and the clamping device has a retainable member,
   wherein in a clamped status of the clamping device:
   the retainable member is urged against the retainer member in an oriented removal direction of the electric power supply unit from the component, orthogonal to the first geometric axis,
   the first axis is interposed between the second axis and the retainable and retainer members in the oriented removal direction,
   the second axis is closer to said one of the component and the electric power supply unit with respect to the first axis in a third direction orthogonal to the direction of the rotation axes and to the oriented removal direction, and
   wherein the rotation of the clamping device in a first direction about the first axis and in a second direction opposed to the first direction about the second axis allows the retainable member to be brought beyond the retainer member during clamping and unclamping.

2. The electrically powered bicycle equipment according to claim 1, wherein the retainable member and the retainer member embody an effective coupling in retaining, in the clamped status of the clamping device, the electric power supply unit also in the third direction.

3. The electrically powered bicycle equipment according to claim 2, wherein the retainable member and the retainer member have mutually abutting surfaces in the clamped status of the clamping device, said surfaces being slanted with respect to the removal direction, a first edge being comparatively close to the first axis in the removal direction and to said one of the component and the electric power supply unit in the third direction, and a second edge opposed to the first edge being comparatively far from the first axis in the removal direction and from said one of the component and the electric power supply unit in the third direction.

4. The electrically powered bicycle equipment according to claim 1, wherein the retainable member and the retainer member comprise a protrusion and a cavity oversized with respect to the protrusion in the removal direction but not in the direction of the rotation axes.

5. The electrically powered bicycle equipment according to claim 1, wherein the first axis and the second axis are defined by two opposed ends of a rigid member, having sufficient stiffness to withstand the traction in the clamped status of the clamping device, the two opposed ends extending in respective pivoting seats formed on facing faces, in the clamped status of the clamping device, of said one of the component and the electric power supply unit and of the clamping device.

6. The electrically powered bicycle equipment according to claim 5, wherein the rigid member is a possibly split quadrangular ring.

7. The electrically powered bicycle equipment according to claim 6, wherein at least one of the pivoting seats comprises a cylindrical undercut cavity.

8. The electrically powered bicycle equipment according to claim 6, wherein the rigid member is a quadrangular ring split at one of the two opposed sides, the corresponding pivoting seat comprising a through hole or a pair of coaxial blind holes.

9. The electrically powered bicycle equipment according to claim 1, wherein the seat for removable attachment of the electric power supply unit is configured to retain at least one region of the electric power supply unit, substantially opposed to a region involved by the clamping device, against removal from the component in at least one way in the direction of the rotation axes and/or in at least one way in the third direction.

10. The electrically powered bicycle equipment according to claim 1, wherein the seat is configured to allow and possibly oblige seating the electric power supply unit through a roto-translational movement.

11. The electrically powered bicycle equipment according to claim 1, wherein the electric contacts of one and a same between the electric power supply unit and the component are of the pogo pin type.

12. The electrically powered bicycle equipment according to claim 1, wherein in at least one of the electric power supply unit and the component, the electric ground contact is more outcropping than the other electric contacts.

13. The electrically powered bicycle equipment according to claim 1, wherein the bicycle equipment is a bicycle derailleur comprising:
   a plurality of mutually movable components, comprising a support body configured to be attached to a bicycle frame, a chain guide and a pair of connecting arms extended between the support body and the chain guide, and
   a geared motor controlling the mutual motion between chain guide and support body,
   wherein said component having a seat for the electric power supply unit is a preselected component of the mutually movable components.

14. The electrically powered bicycle equipment according to claim 13, wherein
   the derailleur is a front derailleur.

15. The electrically powered bicycle equipment according to claim 13, wherein
   the derailleur is a rear derailleur and the preselected component is one of the connecting arms.

16. The electrically powered bicycle equipment according to claim 14, wherein the geared motor is housed in the support body.

17. The electrically powered bicycle equipment according to claim 15, wherein the preselected component is the proximal connecting arm.

18. The electrically powered bicycle equipment according to claim 15, wherein the geared motor is housed in the support body.

* * * * *